US012413331B2

(12) United States Patent
Kim

(10) Patent No.: US 12,413,331 B2
(45) Date of Patent: Sep. 9, 2025

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventor: Bonghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 484 days.

(21) Appl. No.: 17/799,836

(22) PCT Filed: Feb. 18, 2020

(86) PCT No.: PCT/KR2020/002299
§ 371 (c)(1),
(2) Date: Aug. 15, 2022

(87) PCT Pub. No.: WO2021/167119
PCT Pub. Date: Aug. 26, 2021

(65) Prior Publication Data
US 2023/0090593 A1    Mar. 23, 2023

(51) Int. Cl.
*H04L 1/00* (2006.01)
*H04B 7/06* (2006.01)
*H04L 1/20* (2006.01)

(52) U.S. Cl.
CPC ......... *H04L 1/0003* (2013.01); *H04B 7/0632* (2013.01); *H04L 1/0026* (2013.01); *H04L 1/203* (2013.01)

(58) Field of Classification Search
CPC ..... H04L 1/0003; H04L 1/0026; H04L 1/203; H04L 1/0009; H04L 1/0015;
(Continued)

(56) References Cited

U.S. PATENT DOCUMENTS

2012/0276896 A1* 11/2012 Ren .................. H04L 1/0018
455/423
2013/0223255 A1     8/2013 Enescu et al.
(Continued)

OTHER PUBLICATIONS

Mateus P. Mota et al., "Adaptive Modulation and Coding based on Reinforcement Learning for 5G Networks", Nov. 25, 2019. (From Applicant's IDS) (Year: 2019).*
(Continued)

*Primary Examiner* — Mang Hang Yeung
(74) *Attorney, Agent, or Firm* — BRYAN CAVE LEIGHTON PAISNER LLP

(57) ABSTRACT

A method for transmitting data by a base station in a wireless communication system according to the present disclosure comprises: transmitting a reference signal (RS) to one or more user equipments (UEs); receiving, from the one or more UEs, channel quality indication (CQI) information based on the reception of the RS; determining a modulation and coding scheme (MCS) level on the basis of the CQI information; transmitting data to the one or more UEs in accordance with the MCS level; and receiving, from the one or more UEs, an acknowledgment/negative acknowledgment (ACK/NACK) with respect to the transmitted data, wherein the MCS level is determined on the basis of the CQI information and an offset determined according to a machine learning process, and the machine learning process for determining the offset is performed by configuring the selecting of one of a plurality of MCS offset values as an operation value of machine learning, configuring an error rate for the operation value as a state value of the machine learning, and configuring a processing rate at a level where the error rate satisfies a predetermined reference, as a compensation value of the machine learning.

15 Claims, 12 Drawing Sheets

(58) Field of Classification Search
CPC .......... H04L 1/1867; H04L 1/20; H04L 1/00; H04B 7/0632; Y02D 30/70; G06N 20/00
USPC ....................................................... 370/252
See application file for complete search history.

(56) References Cited

U.S. PATENT DOCUMENTS

2019/0239238 A1   8/2019   Calabrese et al.
2020/0044955 A1   2/2020   Pugaczewski

OTHER PUBLICATIONS

Saishankar K.P., "Reinforcement learning techniques for Outer Loop Link Adaptation in 4G/5G systems", Aug. 3, 2017. (From Applicant's IDS) (Year: 2017).*

Mateus P. Mota et al. "Adaptive Modulation and Coding based on Reinforcement Learning for 5G Networks," arXiv: 1912.04030v1, GTEL—Wireless Telecommunications Research Group (Nov. 25, 2019) 6 Pages.

Saishankar Katri Pulliyakode et al. "Reinforcement learning techniques for Outer Loop Link Adaption in 4G/5G systems," arXiv:1708.00994v1, Qualcomm India Private Ltd. (Aug. 3, 2017) 26 pages.

\* cited by examiner

METHOD AND DEVICE FOR TRANSMITTING AND RECEIVING WIRELESS SIGNAL IN WIRELESS COMMUNICATION SYSTEM This application is the National Stage filing under 35 U.S.C. 371 of International Application No. PCT/KR2020/002299 filed on Feb. 18, 2020, the contents of which is hereby incorporated by reference herein in its entirety.

TECHNICAL FIELD

The present disclosure relates to a method and apparatus for transmitting and receiving data in a wireless communication system and, more particularly, to a method of implementing link adaptation power control based on machine learning, and an apparatus supporting the same.

BACKGROUND ART

Wireless communication systems have been widely deployed to provide various types of communication services such as voice or data. In general, a wireless communication system is a multiple access system that supports communication of multiple users by sharing available system resources (bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

The present disclosure may be related to the following technical configurations.

<Artificial Intelligence (AI))>

AI refers to a field that studies artificial intelligence or methodology capable of achieving artificial intelligence. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process of updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN in a state in which the label for the training data is not given. Reinforcement learning may refer to a learning method in which an agent defined in a certain environment is trained to select a behavior or a behavior order that maximizes accumulative compensation in each state.

Among ANNs, machine learning implemented as a deep neural network (DNN) including a plurality of hidden layers is also called deep learning. Deep learning is a part of machine learning. Hereinbelow, machine learning includes deep learning.

DISCLOSURE

Technical Problem

The present disclosure relates to a method and apparatus for efficiently implementing link adaptation and power control based on machine learning.

The objects to be achieved by the present disclosure are not limited to what has been particularly described hereinabove and other objects not described herein may be considered by persons skilled in the art from embodiments of the present disclosure to be described hereinbelow.

Technical Solution

The present disclosure relates to a method of transmitting data by a base station in a wireless communication system and apparatuses supporting the same.

According to an aspect of the present disclosure, provided herein is a method of transmitting data by a base station in a wireless communication system, including transmitting a reference signal (RS) to one or more user equipments (UEs); receiving channel quality indication (CQI) information based on reception of the RS from the one or more UEs; determining a modulation and coding scheme (MCS) level based on the CQI information; transmitting data to the one or more UEs in relation to the MCS level; and receiving acknowledgement/negative acknowledgement (ACK/NACK) for the transmitted data. The MCS level is determined based on the CQI information and on an offset determined according to a machine learning process. The machine learning process for determining the offset is performed by setting any one selected from among a plurality of MCS offset values to an operation value of machine learning, setting an error rate for the operation value to a state value of the machine learning, and setting a processing rate at a level at which the error rate satisfies a predetermined criterion to a reward value of the machine learning.

In another aspect of the present disclosure, provided herein is a base station for transmitting data in a wireless communication system, including a radio frequency (RF) unit; and a processor. The processor is configured to: transmit a reference signal (RS) to one or more user equipments (UEs); receive channel quality indication (CQI) information based on reception of the RS from the one or more UEs; determine a modulation and coding scheme (MCS) level based on the CQI information; transmit data to the one or more UEs in relation to the MCS level; and receive acknowledgment/negative acknowledgement (ACK/NACK) for the transmitted data. The MCS level is determined based on the CQI information and on an offset determined according to a machine learning process. The machine learning process for determining the offset is performed by setting any one selected from among a plurality of MCS offset values to an operation value of machine learning, setting an error rate for the operation value to a state value of the machine learning, and setting a processing rate at a level at which the error rate satisfies a predetermined criterion to a reward value of the machine learning.

The determining the offset may include (1) obtaining a block error rate (BLER) as a current state of the machine learning; (2) selecting any one of the MCS offset values as machine learning operations applied to the current state; (3) repeating a predetermined number of times a process of calculating an expected reward value of each of the machine learning operations, updating a Q-table of the machine learning according to the calculated expected reward value, and recalculating the expected reward value based on the updated Q-table; and determining one MCS offset value based on the updated Q-table according to the process of (3).

The current state of the machine learning may be obtained based on a duration acquired by unequally quantizing a representation range of the BLER.

The unequally quantizing the representation range of the BLER may include performing quantization by setting a first quantization unit of a first range near a target BLER in the representation range of the BLER to be smaller than a second quantization unit of a second range other than the first range.

The Q-table may be a matrix determined based on the number of the MCS offset values and the quantized representation range of the BLER.

The determining the one MCS offset value may include determining the one MCS offset value based on beta distribution having a first parameter and a second parameter. The first parameter may increase based on reception of ACK and the second parameter may increase based on reception of NACK.

The machine learning process for determining the offset may include performing Q-learning.

The number of the MCS offset values may be set to 2L+1, where L is the number of MCSs supported by the base station.

The foregoing aspects of the present disclosure are merely a part of the embodiments of the present disclosure and various embodiments into which the features of the present disclosure are incorporated may be derived and understood by persons skilled in the art from the following detailed description of the present disclosure.

Advantageous Effects

According to the present disclosure, link adaptation and power control may be efficiently implemented based on machine learning. According to the present disclosure, system throughput may be improved by selecting an optimal modulation and coding scheme (MCS) offset value based on reinforcement learning in the case of link adaption.

According to the present disclosure, transmit power may be reduced by selecting an optimal signal-to-interference ratio (SIR) adjustment value based on reinforcement learning in the case of power control link adaption.

The effects that are achievable by the present disclosure are not limited to what has been particularly described hereinabove and other advantages not described herein will be more clearly understood by persons skilled in the art from the following detailed description of the present disclosure.

BRIEF DESCRIPTION OF DRAWINGS

The accompanying drawings, which are included to provide a further understanding of the disclosure and are incorporated in and constitute a part of this specification, illustrate embodiments of the disclosure.

BEST MODE

Figure 1A:
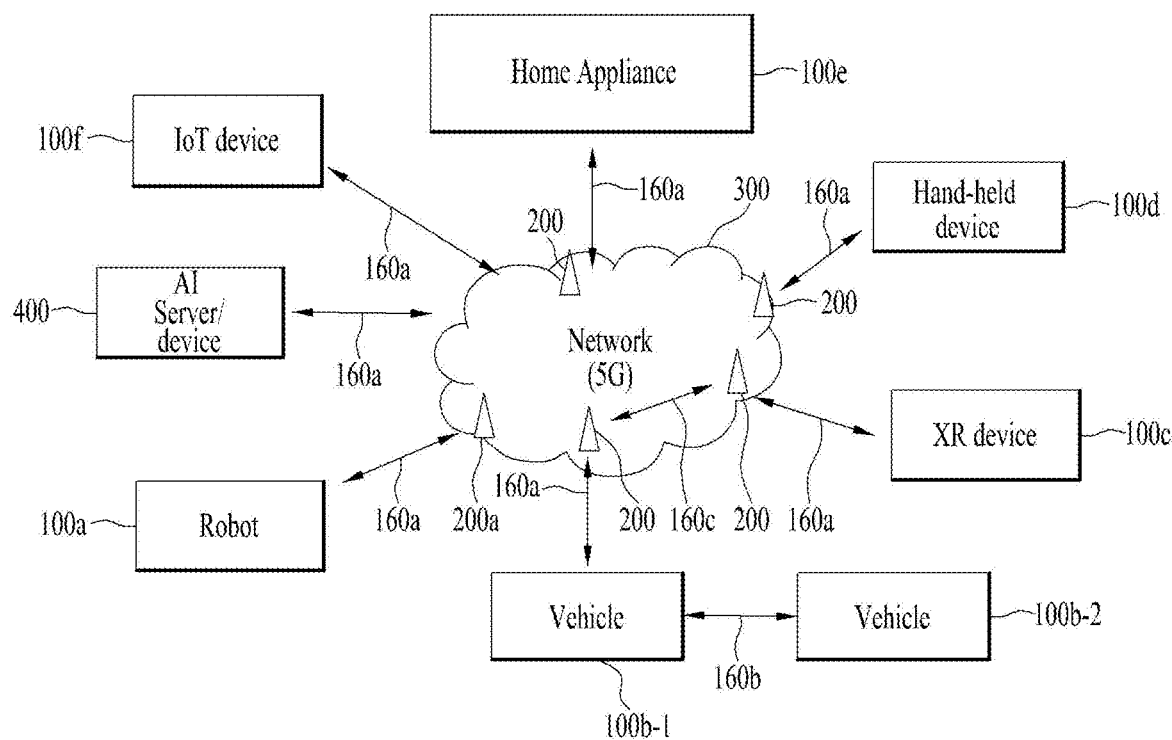
FIG. 1A illustrates a communication system applied to the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system and 3GPP LTE-A, the following descriptions are applicable to other random mobile communication systems in a manner of excluding unique features of the 3GPP LTE and 3GPP LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a UE may receive information from a BS on downlink and transmit information on uplink as well. Information transmitted or received by the UE may include various kinds of data and control information. In accordance with types and usages of the information transmitted or received by the UE, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1A illustrates a communication system 1 applied to the present disclosure.

Referring to FIG. 1A, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 1B:
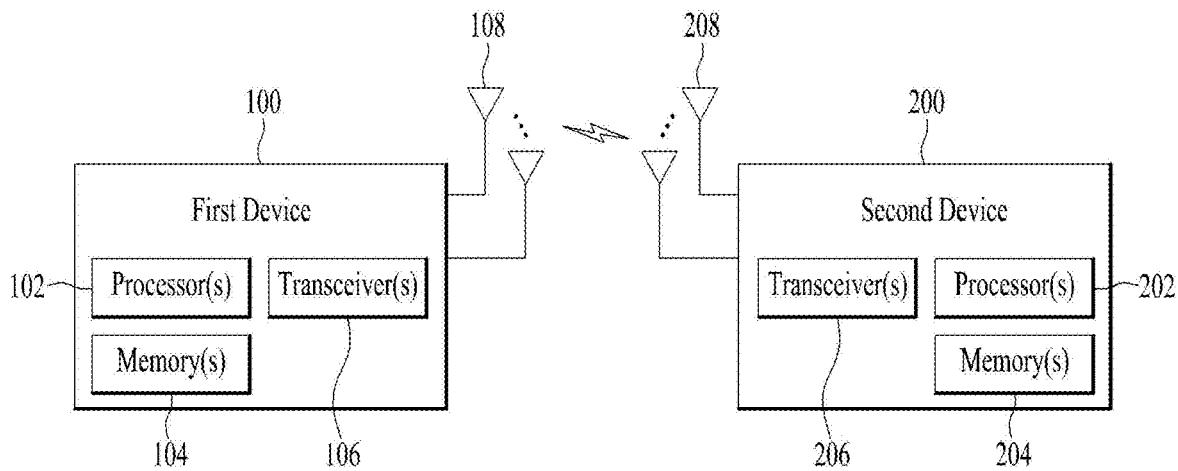
FIG. 1B illustrates wireless devices applicable to the present disclosure.

FIG. 1B illustrates wireless devices applicable to the present disclosure.

Referring to FIG. 1B, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 1A.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

The first wireless device 100 and/or the second wireless device 200 may have a single antenna or multiple antennas. When at least one of the first wireless device 100 or the second wireless device 200 has multiple antennas, a wireless communication system may be referred to as a multiple input multiple output (MIMO) system.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 1C:
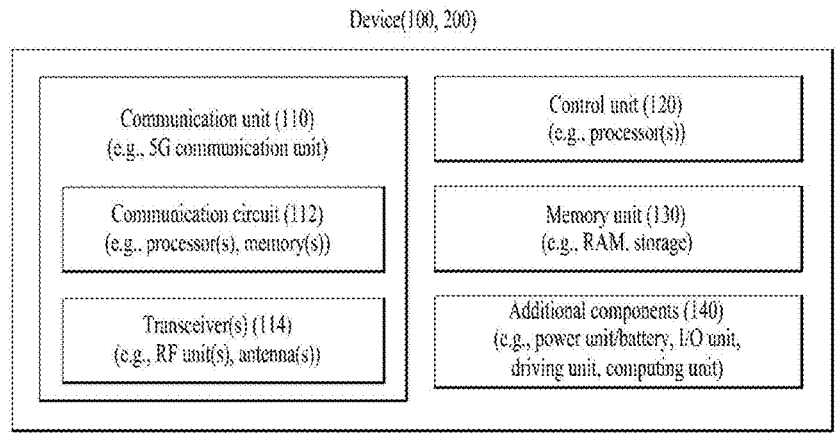
FIG. 1C illustrates other examples of wireless devices applicable to the present disclosure.

FIG. 1C illustrates another example of wireless devices applied to the present disclosure.

The wireless devices may be implemented in various forms according to use-cases/services (refer to FIG. 1A).

Referring to FIG. 1C, wireless devices 100 and 200 may correspond to the wireless devices 100 and 200 of FIG. 1B and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2B. For example, the transceiver(s) 114 may include the one or more transceivers 106 and 206 and/or the one or more antennas 108 and 208 of FIG. 2B. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 1A), the vehicles (100*b*-1 and 100*b*-2 of FIG. 1A), the XR device (100*c* of FIG. 1A), the hand-held device (100*d* of FIG. 1A), the home appliance (100*e* of FIG. 1A), the IoT device (100*f* of FIG. 1A), a digital broadcasting terminal, a hologram device, a public safety device, an MTC device, a medicine device, a FinTech device (or a finance device), a security device, a climate/environment device, the AI server/device (400 of FIG. 1A), the BSs (200 of FIG. 1A), a network node, etc. The wireless device may be mobile or fixed according to a use-case/service.

In FIG. 1C, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

According to the present disclosure, a device for performing channel coding based on polar coding may include a transceiver, a memory, and at least one processor connected to the transceiver and memory.

The memory may be configured to store instructions that, when executed by the at least one processor, cause the at least one processor to perform operations.

Figure 2:
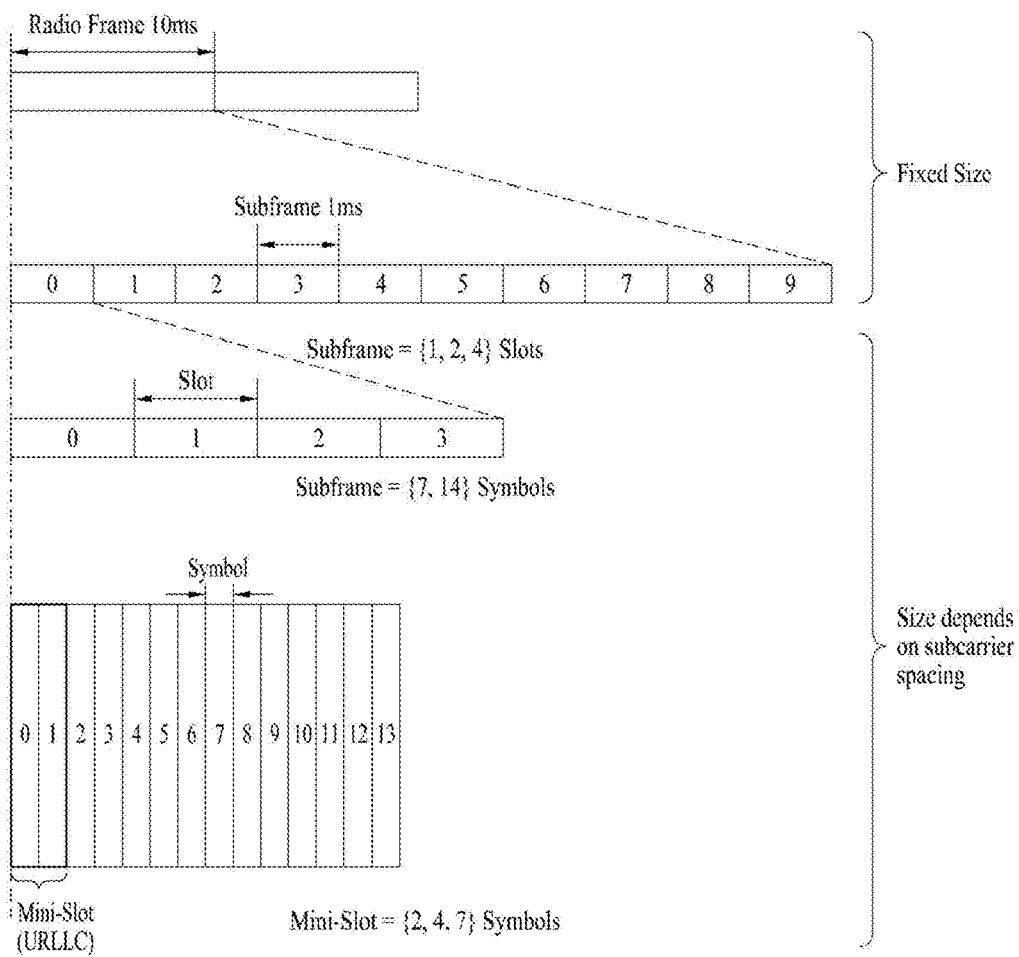
FIG. 2 is a diagram illustrating a frame structure of a new radio access technology (new RAT or NR).

FIG. 2 is a diagram illustrating a frame structure in NR.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of a frequency band. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1.

TABLE 1

| μ | $\Delta f = 2^{\mu}*15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., SCSs) to support various 5G services. For example, in an SCS of 15 kHz, the NR system supports a wide area in conventional cellular bands. In an SCS of 30/60 kHz, the NR system supports a dense urban environment, low latency, and wide carrier bandwidth. In an SCS of 60 kHz or above, the NR system supports a bandwidth higher than 24.25 GHz to overcome phase noise.

NR frequency bands are divided into two frequency ranges: frequency range 1 (FR1) and frequency range 2 (FR2). FR1 covers sub-6 GHz frequency bands, and FR2 covers frequency bands above 6 GHz, i.e., bands in the millimeter wavelength (mmWave).

Table 2 shows the definitions of the NR frequency ranges.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit, $T_c=1/(\Delta f_{max}*N_f)$ where $\Delta f_{max}=480*10^3$ and $N_f=4096$. DL and UL transmissions are organized into radio frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. In this case, there may exist one set of frames for UL and one set of frames for DL. Further, transmission of UL frame #i from the UE should state a time $T_{TA}=N_{TA}T_S$ before the start of a corresponding DL frame. For a numerology μ, slots are numbered with $n^\mu_s \in \{0, \ldots, N^{slot,\mu}_{subframe}-1\}$ in an increasing order in a subframe, and with $n^\mu_s \in \{0, \ldots, N^{slot,\mu}_{frame}-1"\}$ in an increasing order in a radio frame. One slot includes $N^\mu_{symb}$ consecutive OFDM symbols, and $N^\mu_{symb}$ depends on a used numerology and slot configuration. The start of a slot $n^\mu_s$ in a subframe is aligned in time with the start of an OFDM symbol $n^\mu_s*N^\mu_{symb}$ in the same subframe. All UEs are not capable of simultaneous transmission and reception, which implies that all OFDM symbols of a DL slot or a UL slot may not be used. Table 3 lists the number $N^{slot}_{symb}$ of symbols per slot, the number $N^{frame,\mu}_{slot}$ of slots per frame, and the number $N^{Nsubframe,\mu}_{slot}$ of slots per subframe, for each SCS in a NOMAI CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 2 illustrates an example with μ=2, that is, an SCS of 60 kHz, in which referring to Table 2 one subframe may include four slots. One subframe={1, 2, 4} slots in FIG. 2 which is exemplary, and the number of slot(s) which may be included in one subframe is defined as listed in Table 2.

Further, a mini-slot may include 2, 4 or 7 symbols, fewer symbols than 2, or more symbols than 7.

In the NR system, an antenna port, a resource grid, a resource element, a resource block, a carrier part, etc. may be considered as physical resources. Hereinafter, the physical resources considerable in the NR system will be described in detail.

First, an antenna port may be defined such that a channel conveying symbols on the antenna port is capable of being inferred from a channel conveying other symbols on the same antenna port. When the large-scale properties of a channel carrying symbols on one antenna port are inferred from a channel carrying symbols on another antenna port, the two antenna ports may be said to be in quasi co-located or quasi co-location (QC/QCL) relationship. The large-scale properties may include at least one of the following parameters: delay spread, Doppler spread, frequency shift, average received power, received timing, average delay, and spatial reception (Rx). The spatial Rx parameter refer to a spatial (Rx) channel characteristic parameter such as angle of arrival.

Figure 3:
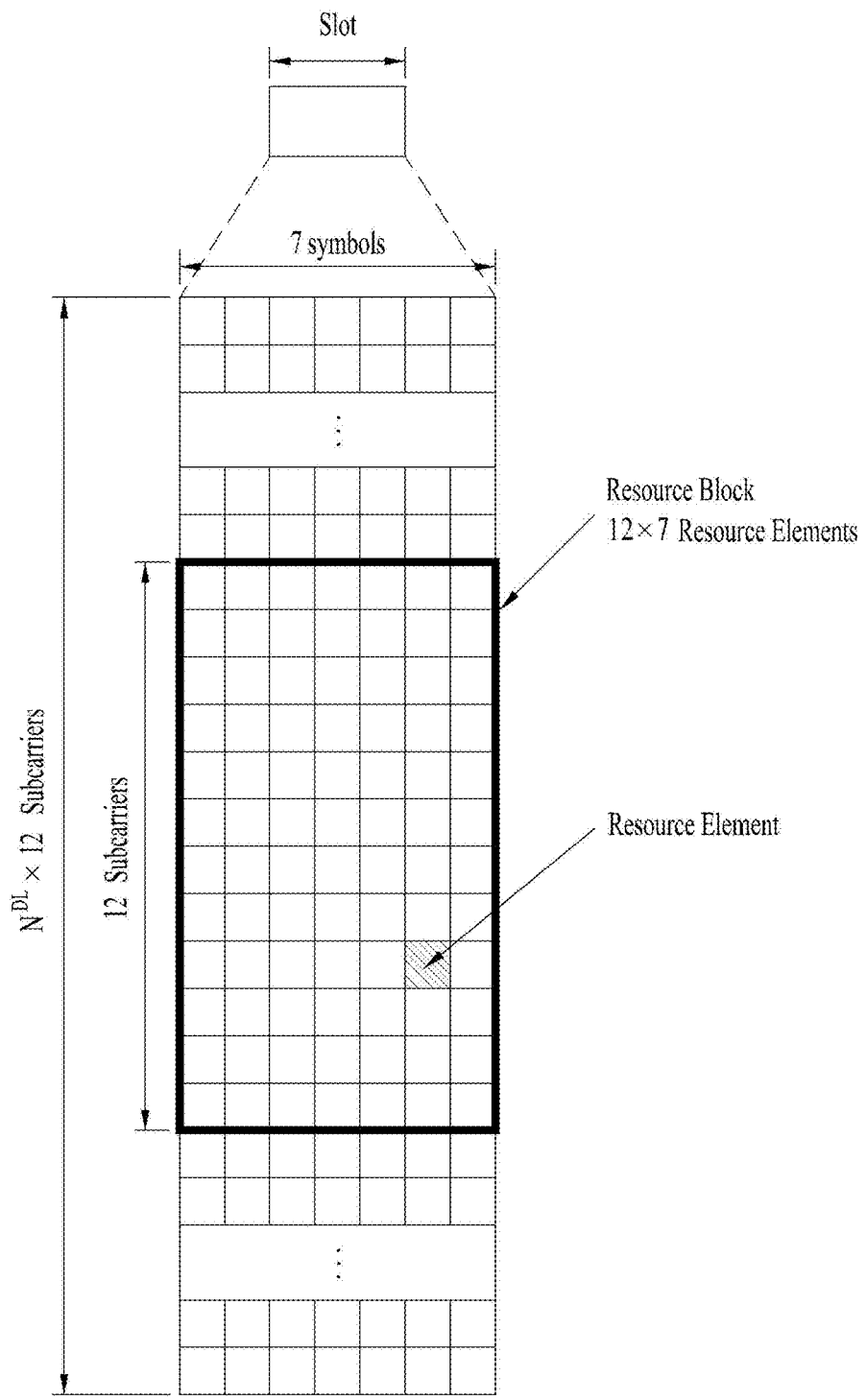
FIG. 3 illustrates a resource grid of NR.

FIG. 3 illustrates a resource grid in the NR system.

Figure 4:
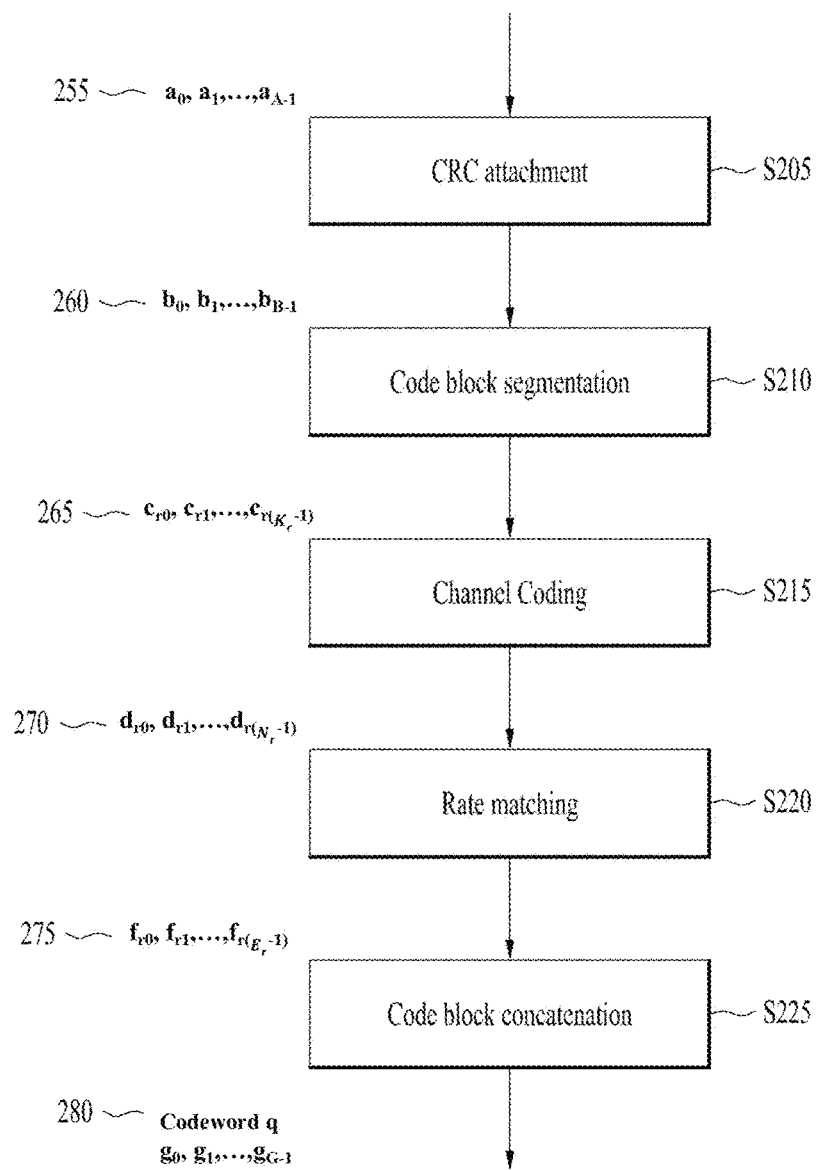
FIG. 4 is a diagram for explaining a channel coding method according to the present disclosure.

Referring to FIG. 3, a resource grid includes $N^\mu_{RB}*N^{RB}_{sc}$ subcarriers in the time domain, and one subframe 14·2^μ OFDM symbols, which is exemplary and thus should not be construed as limiting the disclosure. In the NR system, a transmitted signal is described by one or more resource grids including $N^\mu_{RB}*N^{RB}_{sc}$ subcarriers and $2^\mu N^{RB(\mu)}_{symb}$ OFDM symbols, where $N^\mu_{RB} \leq N^{max,\mu}_{RB}$, $N^{max,\mu}_{RB}$ represents a maximum transmission bandwidth, which may be different for UL and DL as well as according to numerologies. In this case, one resource grid may be configured for each neurology μ and each antenna port p, as illustrated in FIG. 4. Each element of the resource grid for the numerology μ and the antenna port p is referred to as an RE, which is uniquely identified by an index pair (k,l) where k=0, . . . , $N^\mu_{RB}*N^{RB}_{sc}-1$ is a frequency-domain index and l=0, . . . , $2^\mu N^{(\mu)}_{symb}-1$ indicates the position of a symbol in a subframe. An RE in a slot is indicated by an index pair (k,l) where l=0, . . . . $N^\mu_{symb}-1$. An RE (k,l) for the numerology μ and the antenna port p corresponds to a complex value $a_{k,l}^{(p,\mu)}$. When there is no risk of confusion or a specific antenna port or a numerology is not specified, the indexes p and μ may be dropped, and as a result, the complex value may be $a_{k,l}^{(p)}$ or $a_{k,l}$. In addition, an RB is defined as $N^{RB}_{sc}=12$ consecutive subcarriers in the frequency domain.

Considering that a UE may be incapable of supporting a wide bandwidth supported in the NR system, the UE may be configured to operate in a part of the frequency BW of a cell (hereinafter referred to as a bandwidth part (BWP)).

In the NR system, resource blocks may be divided into physical resource blocks defined within the BWP and common resource blocks numbered from 0 upward in the frequency domain for an SCS configuration μ.

Point A is obtained as follows.

For a PCell downlink, offsetToPointA represents the frequency offset between point A and the lowest subcarrier of the lowest resource block overlapping with an SS/PBCH block used by the UE for initial cell selection, which is expressed in units of resource blocks on the assumption of an SCS of 15 kHz for FR1 and an SCS of 60 kHz for FR2.

For other cases, absoluteFrequencyPointA represents the frequency location of point A expressed as in the absolute radio-frequency channel number (ARFCN).

The center of subcarrier 0 of common resource block 0 for the SCS configuration μ coincides with point A, which act as the reference point for resource grids. The relationship between a common resource block number ecRB in the frequency domain and a resource elements (k,l) for the SCS configuration µ is given by Equation 1.

$$n^{\mu}_{CRB} = \left\lfloor \frac{k}{N^{RB}_{sc}} \right\rfloor \quad \text{[Equation 1]}$$

In Equation 1, k is defined relative to point A such that k=0 corresponds to a subcarrier around point A. Physical resource blocks are numbered from 0 to $N^{size}_{BWP,i-1}$ within the BWP, where i is the number of the BWP. The relationship between a physical resource block $n_{PRB}$ and a common resource block $n_{CRB}$ in BWP i is given by Equation 2.

$$n_{CRB} = n_{PRB} + N^{start}_{BWP,i} \quad \text{[Equation 2]}$$

In Equation 2, $N^{start}_{BWP,i}$ is a common resource block where the BWP starts relative to common resource block 0.

FIG. 4 is a diagram for explaining a channel coding method according to the present disclosure.

Data subject to channel coding is referred to as a transport block. Typically, depending on the performance of channel coding, the transport block is divided into code blocks, each of which has a size less than or equal to a predetermined value. For example, in turbo coding of 3GPP TS 36.212, the code block may have a maximum size of 6144 bits. In low density parity check (LDPC) coding of 3GPP TS 38.212, the code block may have a maximum size of 8448 bits (in base graph 1) or 3840 bits (in base graph 2). In polar coding, the code block may have a minimum size of 32 bits and a maximum size of 8192 bits. The code block may be subdivided into sub-blocks. In polar coding methods according to the present disclosure, an input bit sequence (265) ($c_{r0}, c_{r1}, \ldots, c_{r(Kr-1)}$) is interleaved, the interleaved input bit sequence (not shown in the drawing) ($c'_{r0}, c'_{r1}, \ldots, c'_{r(Kr-1)}$) may be encoded based on polar codes. The encoded bit sequence (270) ($d_{r0}, d_{r1}, \ldots, d_{r(Nr-1)}$) may be rate matched. The rate matching of the encoded bit sequence (270) may include: subdividing the encoded bit sequence into sub-blocks; interleaving each of the sub-blocks; performing bit selection for each of the interleaved sub-blocks; and interleaving coded bits again. The bit selection for each of the interleaved sub-blocks may include repeating, puncturing, or shortening some bits.

The channel coding method according to the present disclosure may include attaching a cyclic redundancy check (CRC) code to a transport block (S205); dividing the transport block into code blocks (S210); encoding the divided code blocks (S215); perform rate matching of the encoded code blocks (S220); and concatenating the rate-matched code blocks (S225).

In step S205, party bits with a length of L are attached to the transport block (255) ($a_0, \ldots, a_{A-1}$). The length L may be any one of 6, 11, 16, and 24. Typically, cyclic generator polynomials are used to generate party bits. In addition, scrambling operation may be applied to output bits (260) ($b_0, \ldots, b_{B-1}$), which depend on the CRC attachment, with a radio network temporary identifier (RNTI). Exclusive OR (EOR) operation may be applied between a scrambling sequence and corresponding bits based on the scrambling operation.

The output bits (260) ($b_0, \ldots, b_{B-1}$) depending on the CRC attachment may be segmented into code blocks (265) according to code block sizes. This is called code block segmentation. The code block sizes are determined by channel coding methods. A code block size suitable for each channel coding method may be determined theoretically or experimentally. For example, the segmented code blocks (265) ($c_{r0}, \ldots, c_{r(Kr-1)}$) may be encoded as encoded bits (270) ($d_{r0}, \ldots, d_{r(Nr-1)}$), respectively.

The encoded bits (270) ($d_{r0}, \ldots, d_{r(Nr-1)}$) are generated by applying channel coding to the code blocks (265) ($c_{r0}, \ldots, c_{r(Kr-1)}$) (S215). The generated encoded bits (270) may be rate-matched by shortening and puncturing. Alternatively, the encoded bits (270) may be rate-matched by sub-block interleaving, bit selection, and/or interleaving. That is, the encoded bits (270) ($d_{r0}, \ldots, d_{r(Nr-1)}$) are converted into rate-matched bits (275) ($f_{r0}, \ldots, f_{r(gr-1)}$) (S220). Typically, interleaving may refer to a process for changing a sequence of bits and reduce the occurrence of errors. The interleaving is designed in consideration of efficient de-interleaving.

Sub-block interleaving may mean a process for dividing a code block into a plurality of sub-blocks (e.g., 32 sub-blocks) and allocating bits based on the sub-block interleaving.

The bit selection may mean a process for increasing a bit sequence by repeating bits based on the number of bits to be rate-matched or decreasing the bit sequence based on shortening, puncturing, etc. The interleaving may mean a process for interleaving encoded bits after the bit selection.

In another example of the present disclosure, the rate matching may include the bit selection and interleaving. The sub-block interleaving is not mandatory.

After interleaving the encoded bits, code block concatenation is applied to concatenate the code blocks (275) so that a codeword (285) ($g_0, \ldots, g_{G-1}$) may be generated (S225). The generated codeword 280 may be equivalent to one transport block.

Figure 5:
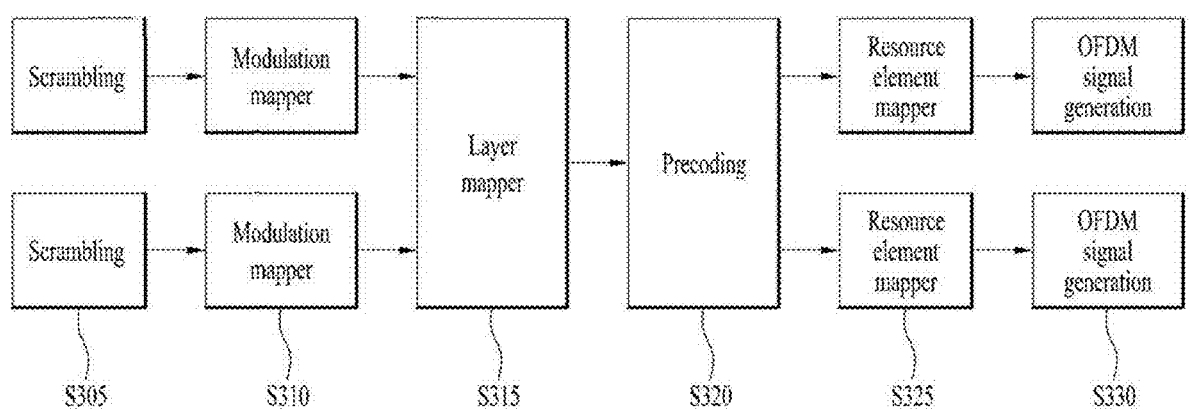
FIGS. 5 and 6 are diagrams for explaining a modulation method according to the present disclosure.
Figure 6:
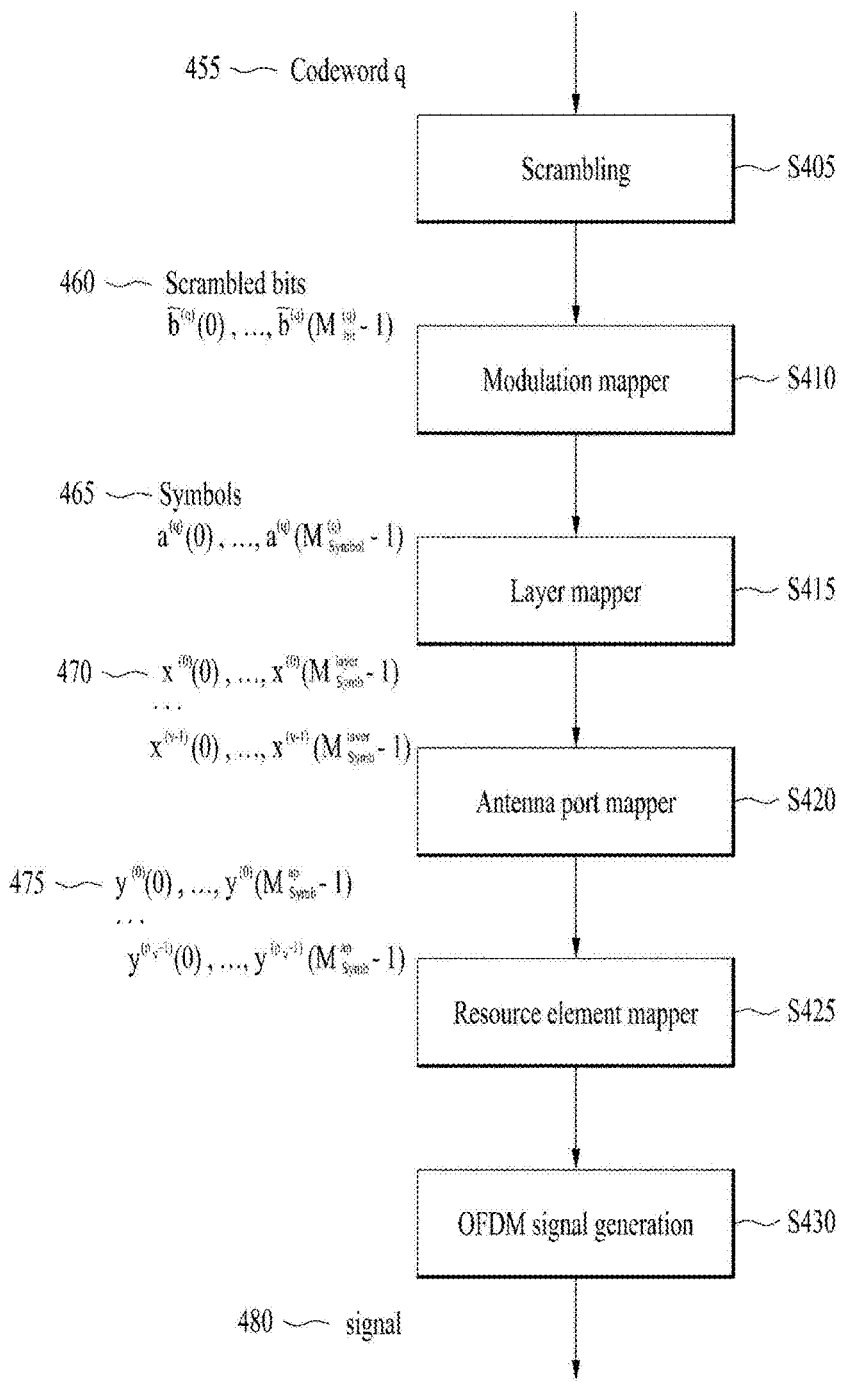

FIGS. 5 and 6 are diagrams for explaining a modulation method according to the present disclosure.

Referring to FIGS. 5 and 6, one or more codewords are input and scrambled (S305 and S405). For example, scrambling may be performed based on EOR operation between an input bit sequence and a predetermined bit sequence. The scrambled bits are modulated (S310 and S410), and the modulated symbols are mapped to layers (S315 and S415). The symbols mapped to the layers are precoded for antenna port mapping. The precoded symbols are mapped to resource elements (S325 and S425). The mapped symbols are generated as OFDM signals (S330 and S430) and transmitted through antennas.

Figure 7:
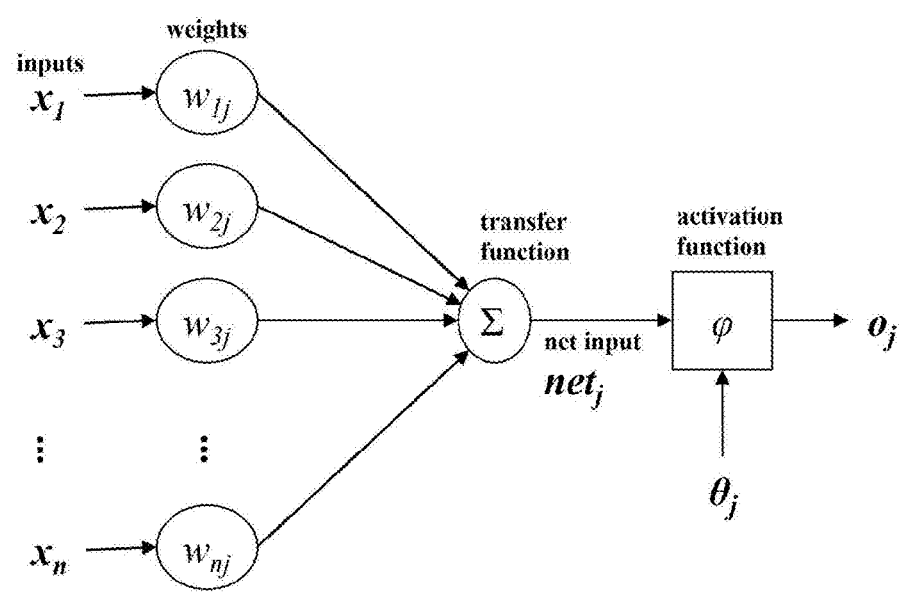
FIG. 7 is a diagram for explaining a backpropagation method in a neural network.

FIG. 7 is a diagram for explaining reinforcement learning.

To update the weights of a neural network, backpropagation may be performed.

In a backpropagation model, the error function is defined by E=L(y, t), and the weight is applied to an output $o_k$ to obtain an input (input, $net_j$) of the neural network.

If a neuron is in the first layer after the input layer, $o_k$ of the input layer may simply be an input to the network, $x_k$.

Figure 8:
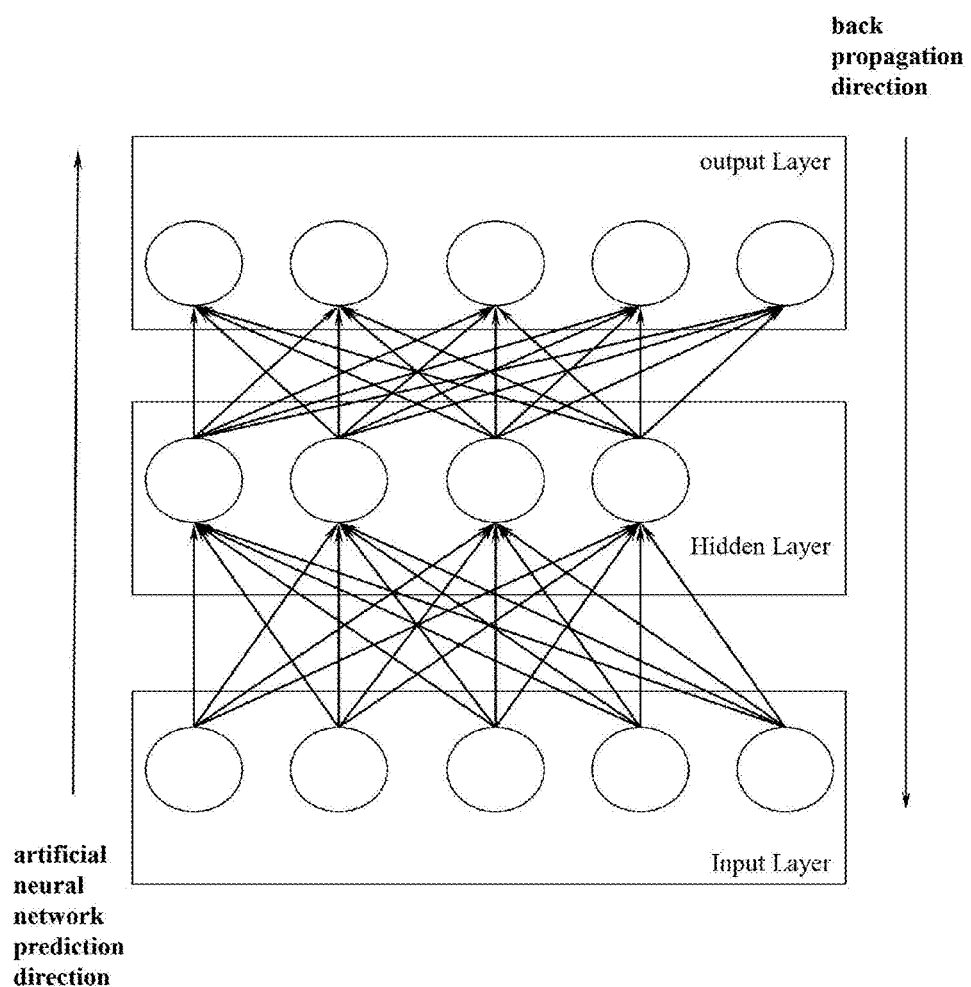
FIG. 8 is an exemplary diagram illustrating a prediction method of an artificial neural network (ANN).

Referring to FIG. 8, $o_j$ may be defined as shown in Equation 5.

$$o_j = \varphi(net_j) = \varphi\left(\sum_{k=1}^{n} w_{kj} o_k\right) \quad \text{[Equation 3]}$$

Referring to FIG. 8, the error function E may satisfy Equation 6.

$$\frac{\partial E}{\partial w_{ij}} = \frac{\partial E}{\partial o_j} \frac{\partial o_j}{\partial w_{ij}} = \frac{\partial E}{\partial o_j} \frac{\partial o_j}{\partial net_j} \frac{\partial net_j}{\partial w_{ij}} \quad \text{[Equation 4]}$$

-continued $$\frac{\partial net_j}{\partial w_{ij}} = \frac{\partial}{\partial w_{ij}}\left(\sum_{k=1}^{n} w_{kj}o_k\right) = \frac{\partial}{\partial w_{ij}}(w_{ij}o_i) = o_i$$

$$\frac{\partial o_j}{\partial net_j} = \frac{\partial(net_j)}{\partial net_j}$$

▶ $\frac{\partial E}{\partial o_j}$: E as a function with the inputs being all neurons, $L = \{u, v, w, \ldots\}$ receiving from input neurons → If $o_j$ is an output neuron, $\frac{\partial E}{\partial o_j} = \frac{\partial E}{\partial y} = \frac{\partial L(y, t)}{\partial y}$ → $\frac{\partial E}{\partial o_j} = \sum_{l \in L}\left(\frac{\partial E}{\partial net_l}\frac{\partial net_l}{\partial o_j}\right) = \sum_{l \in L}\left(\frac{\partial E}{\partial o_l}\frac{\partial o_l}{\partial net_l}\frac{\partial net_l}{\partial o_j}\right) =$ $\sum_{l \in L}\left(\frac{\partial E}{\partial o_l}\frac{\partial o_l}{\partial net_l}w_{jl}\right)$ → $\frac{\partial E}{\partial w_{ij}} = \frac{\partial E}{\partial o_l}\frac{\partial o_l}{\partial net_l}o_i = \delta_i o_i$ FIG. 8 is a diagram for explaining a prediction method in an artificial neural network.

An artificial neural network includes an input layer composed of first input data, an output layer composed of last output data, and a hidden layer as an intermediate layer for calculating output data from input data. There are one or more hidden layers, and an artificial neural network including two or more hidden layers is called a deep neural network (DNN). The actual operation is performed at nodes in each floor, and each node may calculate based on the output values of other nodes connected by connection lines.

As shown in FIG. 8, input data do not affect each other, and nodes belonging to the same layer do not affect each other. Each layer exchanges data as input or output values only with nodes at adjacent layers, i.e., upper or lower layers.

FIG. 8 shows that all nodes in different layers are connected to each other by connection lines, but connection lines between nodes belonging to adjacent layers may be omitted if necessary. However, when there is no connection line, processing may be performed by setting a weight of 0 for a corresponding input value.

When the results of an output layer are predicted from an input layer according to the prediction direction of the artificial neural network, an input value may be predicted from the results during learning. In general, in artificial neural networks, since input and output values do not have a one-to-one correspondence, it is difficult to restore the original input layer from the output layer as it is. However, if input data calculated from the results calculated by a backpropagation algorithm in consideration of a prediction algorithm is different from first input data, the prediction of the artificial neural network may be considered to be inaccurate. Therefore, learning may be trained by changing prediction coefficients so that the input data calculated under constraints become similar to the first input data.

Figure 9A:
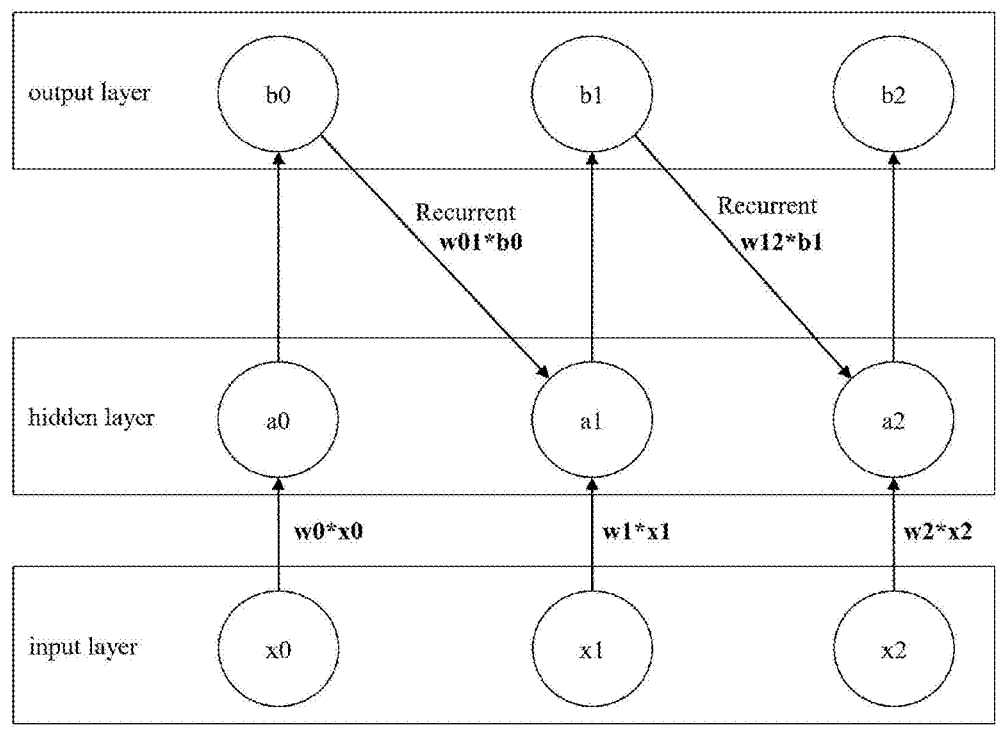
FIG. 9A is a diagram for explaining a method of operating a recurrent neural network.

FIG. 9A is a diagram for explaining a method of operating a recurrent neural network.

In a recurrent neural network (RNN), when there are chronological input data x0, x1, and x2, an output value a0 may be predicted only from x0, unlike the artificial neural network of FIG. 8. In addition, an output value b0 may be calculated based thereon, and b0 may be reused to predict a1.

In the artificial neural network of FIG. 8, it is assumed that multiple input data are simultaneously input. If the input data are time series data, prediction may be allowed only after all data are input. Thus, output values may be calculated by an RNN method to process the time series data. In addition, the RNN may be applied to the Markov decision process (MDP).

The MDP provides a reasonable format for plans and actions in the face of uncertainty. The MDP may have various definitions. The definitions of the MDP may be treated equally to variants in question. For example, the MDP may include states, an initial state distribution, actions, state transition distributions, a discount factor, and a reward function.

In the MDP, an event may be processed as follows. First, the event may start at an initial state s0 from the initial state distribution. An action $a_t$ may be selected at a time t, and then a state $s_t$ may transition to a state $s_{t+1}$ based on the state transition distributions. That is, by repeatedly selecting actions $a_0, a_1, a_2, \ldots$, states $s_1, s_2, s_3, \ldots$ may be obtained. Assuming that a discount factor $\gamma$ is the same for each step, a reward may be defined by $R(s_0)+\gamma^*R(s_1)+\gamma^{2*}R(s_2)+\gamma^{3*}R(s_3)+ \ldots$. Although the above example shows that the reward depends on only states, but the reward may depend on not only the states but actions. That is, the reward may be defined by $R(s_t, a_t)$.

In the artificial neural network, learning may be trained in the same way as shown in FIG. 8. When actual prediction is performed based on the trained learning, it may be efficient to use the RNN shown in FIG. 9A.

Figure 9B:
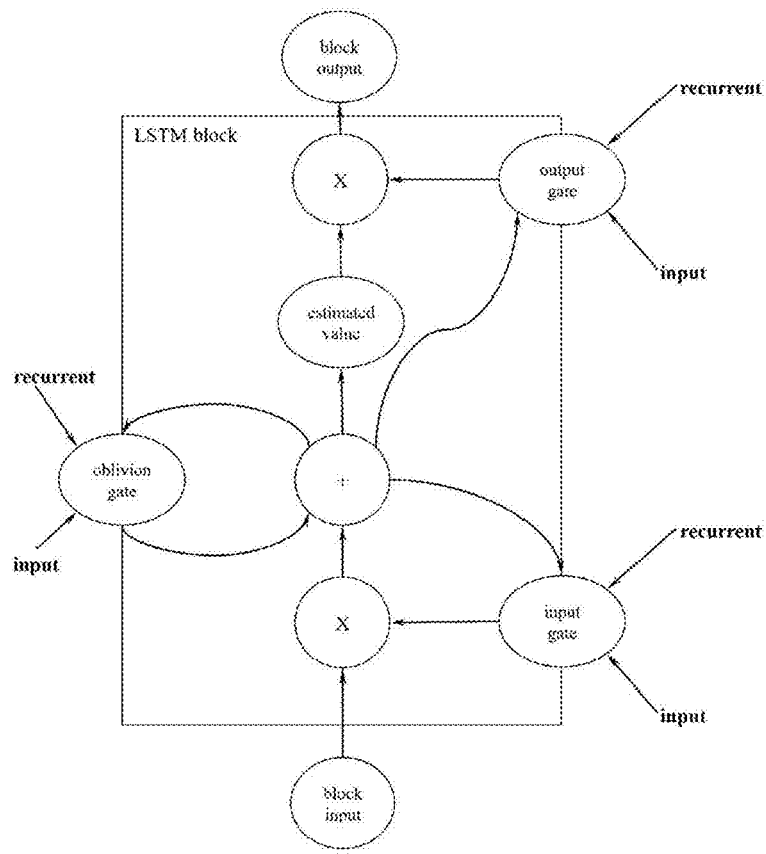
FIG. 9B is a diagram for explaining an operating method of a long short-term memory (LSTM).

FIG. 9B is a diagram for explaining an operating method of long short-term memory (LSTM).

LSTM is a type of RNN method that predicts results based on forgetting gates instead of using weights of the RNN. For prediction of time-series input data, if data are sequentially processed and if past data is processed by the RNN method, old data may be reduced according to the weights, so that the value thereof may become zero after a certain stage. Thus, the old data may be no longer reflected, regardless of the weights.

In the LSTM, since addition is used instead of multiplication, there is an advantage that a recurrent input value does not become zero. However, since there may be a problem in which an old recurrent input value continuously affects a recently predicted value. Thus, coefficients may be adjusted based on the forgetting gates according to learning in order to control the influence of the recurrent input value on the recently predicted value.

1. Reinforcement Learning (RL)

Machine learning may be categorized into supervised learning, unsupervised learning, and RL. The present disclosure proposes a method of efficiently implementing link adaptation and power control using RL.

Figure 10:
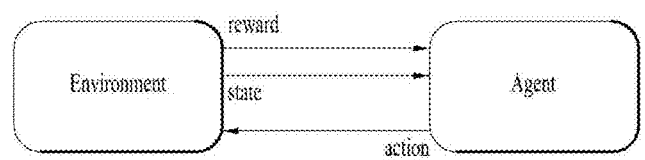
FIG. 10 is a diagram for explaining a reinforcement learning.

FIG. 10 is a diagram for explaining RL.

RL is a type of machine learning technique that does not require any specific model and may learn even without information about an environment. Therefore, when selecting an action for channel variation such as link adaptation or power control, RL may overcome the channel variation through learning even if a radio channel model is not defined (i.e., even if a channel model is changed).

In general, RL is often implemented as Q-learning, which is a method of updating a Q value through learning and selecting an optimal action according to the Q value. A main operation of RL may be explained as an action, a state, and a reward. That is, learning is performed to select an optimal action, which aims to obtain the greatest reward by selecting a specific action. The reward is defined during state transition. If RL is mathematically expressed, RL has the form of the Markov process. The Markov process may be a process in which a current state is determined by a past state and may be represented as a state transition diagram.

An algorithm of Q-learning includes the following: one agent (or decision maker), a finite set of states S, and a set of actions $A_s \subset A$ that may be taken in each state $s \in S$. If a certain action $a \in A_s$ is taken in a certain state s, an agent obtains a reward accordingly. The goal of an agent is to maximize the total sum of rewards. To this end, the agent needs to learn about which action is optimal to take in each state. The optimal action in each state means an action that enables the agent to obtain the greatest reward in the long term in that state. When calculating the long-term reward, an expected value of the sum of discounted rewards is usually calculated, where a reward r obtained after a time of $\Delta t$ from now is discounted by $\gamma^{\Delta t}$ and calculated as $r\gamma^{\Delta t}$. In this case, $\gamma$ is a discount factor with a value between 0 and 1, indicating how much a currently obtained reward is more important than a reward obtained in the future. The algorithm has the following Q function for each state-action pair.

$$Q: SXA \rightarrow R \qquad \text{[Equation 5]}$$

Before the algorithm is started, the Q function has a fixed arbitrary value. An agent at each time t takes an action $\alpha_t$ in a certain state $s_t$ and transitions to a state $s_{t+1}$. In this case, a reward $r_t$ is obtained and the Q function is updated. The core of the algorithm is a simple value iteration method using a weighted sum of an old value and new information as follows.

$$Q(s_t,\alpha_t) \leftarrow (1-\alpha)Q(s_t,\alpha_t)+\alpha(r_t+\gamma Q(s_{t+1},\alpha_t)) \qquad \text{[Equation 6]}$$

where $\alpha$ is a learning speed factor having a value from 0 to 1. When a reached state $s_{t+1}$ is a termination state, one episode is ended. However, Q learning is capable of learning even when a task does not include episodes. This is because, when the discount factor $\gamma$ is less than 1, the discounted total sum is finite even when learning repeats infinitely. When an action is selected while Q-learning is performed, the action may be selected based on a trained Q value as indicated in Equation 7 or may be randomly selected.

$$a(t+1) = \begin{cases} \operatorname*{argmax}_a Q(s(t+1), a), & \text{with probability } 1-e \\ \text{random}, & \text{with probability } e \end{cases} \qquad \text{[Equation 7]}$$

This is known as an e-greedy exploitation-exploration method.

2. Link Adaptation and Power Control

Since a radio channel is changed over time, transmitting data with maximum transmission rate or power that is achievable in the radio channel at a specific time point will be an optimal data transmission method. This is known as link adaptation and power control. To this end, a receiving end may adjust the rate or control the power by transmitting information about the radio channel to a transmitting end or measuring the radio channel.

In order to implement DL link adaptation in the LTE/NR standard, a UE transmits information about a radio channel and/or channel quality indicator (CQI) information to a BS. The CQI information may be expressed in several ways. In LTE/NR, the CQI information may be expressed as the highest modulation and coding scheme (MCS) information capable of transmitting the CQI information without exceeding a specific block error rate (BLER). The BS receives the CQI information transmitted by the UE, determines the MCS of data to be transmitted to a specific UE, and transmits the data.

In order to implement UL power control in a wireless communication system, the BS measures a UL channel using a reference signal (RS) transmitted by the UE. The BS may calculate a signal-to-interference ratio (SIR) for a data channel transmitted by the UE using the measured UL channel information. When the measured SIR value of the UL channel is greater than a predetermined specific SIR value, the BS transmits control information so that the UE reduces transmit power to perform data transmission, and in the opposite case, the BS transmits control information so that the UE increases transmit power to perform data transmission.

In the case of link adaptation, CQI information transmitted by the UE and MCS information determined to be actually used by the BS for data transmission may not be the same. This is due to a CQI feedback error, inaccuracy of CQI estimation, and/or an outdated CQI caused by setting a CQI period to be long. Accordingly, the BS needs to determine an offset value in Equation 8 below.

$$MCS = f(CQI) + m, m:\text{offset index}, -L \leq m \leq L \qquad \text{[Equation 8]}$$

where f is a function of a CQI value transmitted by the UE, and L is the number of MCSs supported by the BS. Therefore, in order to increase system throughput, it is necessary to select an optimal offset value.

In the case of power control, a setting value of a specific SIR may be changed in order to cope with radio channel variation and this is called outer loop power control (OLPC). Assuming that the step size of power control is x dB and a target BLER is 10%, a well-known OLPC algorithm reduces the SIR setting value by 0.9*x dB when a block error occurs and increases the SIR setting value by 0.1*x dB the when no block error occurs. Therefore, in order to increase UE throughput, it is necessary to optimize and set the SIR setting value.

The present disclosure proposes an optimization method using RL when selecting an optimal MCS offset value in link adaptation or setting an optimal SIR setting value in power control. RL may be performed by defining an action, a state, and a reward, which are main operating principles of RL.

3. RL for Link Adaptation

Selecting an optimal MCS offset value during link adaptation becomes a tradeoff between throughout and BLER. That is, when a large MCS offset value is selected, if a block error does not occur, there is a gain in terms of throughput but a target BLER criterion may not be satisfied.

If a problem of selecting an MCS offset m based on Equation 8 is defined as RL, this is as follows.

Objective: Maximization of throughout satisfying the BLER target.

Action: One MCS offset index is selected from among 2L+1 MCS offset indices.

State: BLER of each MCS offset, i.e., $[BLER_1, BLER_2, \ldots, BLER_{(2L+1)}]$.

In this case, since an actual BLER value is a consecutive value between 0 and 1, quantization is needed to express $BLER_i$.

Figure 11A:
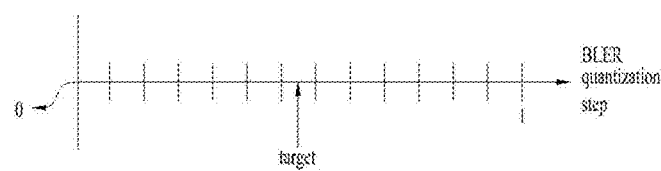
FIG. 11 is a diagram illustrating quantization to which the present disclosure is applicable.
Figure 11B:
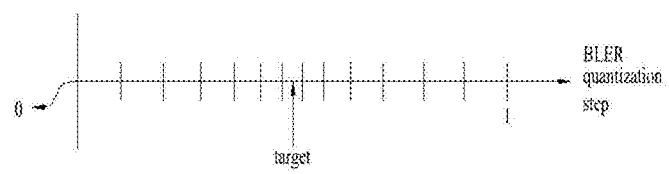

For quantization, a method of equally quantizing values between 0 and 1 and a method of unequally quantizing values between 0 and 1 may be considered. In an embodiment, quantization of a duration near a target BLER may be performed at a narrow interval and quantization of the remaining duration may be performed at a wide interval. FIG. 11A illustrates an embodiment of quantization to which the present disclosure is applicable. FIG. 11A is an exemplary diagram of a method of equally quantizing a BLER value between 0 and 1 in 13 steps, and FIG. 11B is an exemplary diagram of a method of unequally quantizing a BLER value between 0 and 1 in 13 steps so that a duration near a target BLER is unequally quantized at a narrow interval.

Reward: $\theta_m\, r_{MCS}$, MCS=f(CQI)+m, $r_{MCS}$: throughput of MCS where $\theta_m$ may be obtained as follows. It is assumed that one action $\alpha_k$ of a set $\{\alpha_1, \ldots, \alpha_K\}$ of K actions has a reward $r_k$ of $\{1, 0\}$ with a probability of $\theta_k$ or $1-\theta_k$. That is, a reward of 1 is given with a success probability of $\theta_k$ and a reward of 0 is given with a failure probability of $1-\theta_k$. In this case, an action with a maximum $\theta_k$ is selected, where $\theta_k$ may be expressed as beta distribution with parameters $(\alpha_k, \beta_k)$.

$$p(\theta_k) = \frac{\Gamma(\alpha_k + \beta_k)}{\Gamma(\alpha_k)\Gamma(\beta_k)} \theta_k^{\alpha_k-1}(1-\theta_k)^{\beta_k-1} \qquad \text{[Equation 9]}$$

where $\Gamma(\cdot)$ is a gamma function. $(\alpha_k, \beta_k)$ is updated as follows.

$$(\alpha_k, \beta_k) \leftarrow \begin{cases} (\alpha_k, \beta_k) + (r_k, 1-r_k), & \text{for action } k \\ (\alpha_k, \beta_k), & \text{otherwise} \end{cases} \qquad \text{[Equation 10]}$$

Alternatively, $\theta_m$ may be obtained by counting ACK/NACK feedback transmitted after data block decoding.

Figure 12:
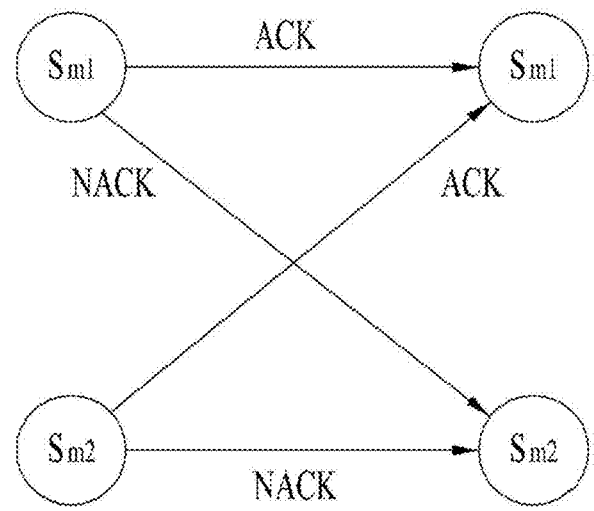
FIG. 12 is a diagram illustrating state transition to which various embodiments of the present disclosure are applicable.

State transition: A state transition diagram when a specific action m is selected may be represented as in the example of FIG. 12. In FIG. 12, $Smi_i$ denotes a state indicating an i-th BLER for an action m. When decoding is successfully performed so that ACK is fed back, a reward of $\theta_m\, r_{MCS}$ is given and, when NACK is fed back, a reward of 0 is given. In this case, when NACK is fed back, a parameter value other than 0 may be given as a reward. That is, the reward may be interpreted as a throughput value for a corresponding action. Table 5 below shows a reward matrix of a Q-table when the number of selectable MCS offsets is m and a BLER state is 2.

TABLE 5

| | Reward | |
|---|---|---|
| | $S_{m1}$ | $S_{m2}$ |
| $S_{m1}$ | $\theta_{m1}\, r_{MCS1}$ | 0 |
| $S_{m2}$ | $\theta_{m2}\, r_{MCS2}$ | |

Q-table: The total size of Q values for performing Q-learning may be Q×Q where Q=(2L+1)*E. In this case, E denotes the size of a quantization step for representing each BLER state. Table 6 below shows a reward matrix of a 2×2 Q-table when the number of selectable MCS offsets is 2 and a BLER state is 2. In Table 6, −1 denotes no state transition.

TABLE 6

| | Reward | | | |
|---|---|---|---|---|
| | $S_{11}$ | $S_{12}$ | $S_{21}$ | $S_{22}$ |
| $S_{11}$ | $\theta_{11}\, r_{11}$ | 0 | −1 | −1 |
| $S_{12}$ | $\theta_{12}\, r_{12}$ | 0 | −1 | −1 |

TABLE 6-continued

| | Reward | | | |
|---|---|---|---|---|
| | $S_{11}$ | $S_{12}$ | $S_{21}$ | $S_{22}$ |
| $S_{21}$ | −1 | −1 | $\theta_{21}\, r_{21}$ | 0 |
| $S_{22}$ | −1 | −1 | $\theta_{22}\, r_{22}$ | 0 |

Figure 13:
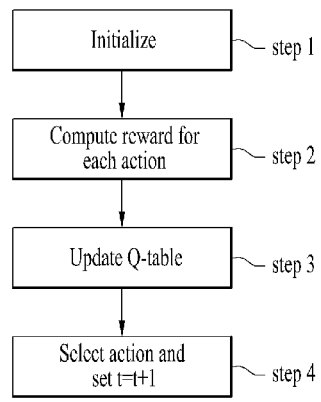
FIG. 13 is a diagram for explaining a method of receiving data based on reinforcement learning according to the present disclosure.

FIG. 13 is a diagram for explaining a method of receiving data based on RL according to the present disclosure.

An algorithm for RL may be derived as follows.

Step 1: Perform initialization
  A learning rate α, a discount factor γ, and an exploration probability e are set.
  A target BLER is set.
  The number of MCS offset indices is set to 2L+1.
  The number of quantization levels for each BLER state E is set.
  Q values of a Q-table are set to 0.
  t=0 and T is set.

Step 2: Compute a reward for each action.
  CQI input and ACK/NACK for a data block
  2-1: Compute $\theta_m$ from beta distribution using parameters $(a_m, b_m)$ for each offset index m, where $a_m$ is incremented for ACK and $b_m$ is incremented for NACK.
  2-2: Compute $\theta_m$ from an empirical formula for each m.

Step 3: Update the Q-table using Equation 6.

Step 4: Select an action using Equation 7 and set t to t+1 (t=t+1).

If t<T, a procedure proceeds to Step 2 (T: preset value)

4. RL for Power Control

Selecting an optimal SIR adjustment value during OLPC becomes a problem of selecting a value suitable for a variation rate of a radio channel. That is, if a large SIR adjustment value is selected, change in a target SIR value increases when the variation of radio channel is not large. Then, interference variability increases, and deterioration occurs in terms of system throughput. However, when the variation of the radio channel is large, transmit power suitable for a channel may be quickly determined.

RL for determining an optimal SIR adjustment value in OLPC may be defined as follows.

Objective: Minimization of total transmit power satisfying the BLER target

Action: One SIR adjustment index is selected from among L SIR adjustment indices.

State: BLER of each SIR adjustment index, for example: [$BLER_1$, $BLER_2$, ..., $BLER_L$]

Reward: Transmit power $p_m$

State transition: A state transition diagram when a specific action m is selected may be expressed as in the example of FIG. 12. In FIG. 12, Smi denotes a state indicating an i-th BLER for an action m. In the state Smi, a reward of $p_{mi}$ (transmit power) may be given by definition. Here, the transmit power may be represented as the sum of "current transmit power and the increased/decreased offset power".

TABLE 7

| | Reward | |
|---|---|---|
| | $S_{m1}$ | $S_{m2}$ |
| $S_{m1}$ | $p_{m1}$ | $p_{m2}$ |
| $S_{m2}$ | $p_{m1}$ | $p_{m2}$ |

Q-table: The total size of Q values for performing Q-learning may be Q×Q where Q=L*E. In this case, E denotes the size of a quantization step for representing each BLER state. Table 8 below shows a reward matrix of a 2×2 Q-table when the number of selectable SIR adjustment indices is 2 and a BLER state is 2. In Table 8, −1 denotes no state transition.

TABLE 8

| | Reward | | | |
|---|---|---|---|---|
| | $S_{11}$ | $S_{12}$ | $S_{21}$ | $S_{22}$ |
| $S_{11}$ | $p_{m1}$ | $p_{m2}$ | −1 | −1 |
| $S_{12}$ | $p_{m2}$ | $p_{m2}$ | −1 | −1 |
| $S_{21}$ | −1 | −1 | $p_{m1}$ | $p_{m2}$ |
| $S_{22}$ | −1 | −1 | $p_{m1}$ | $p_{m2}$ |

FIG. 13 is a diagram for explaining a method of receiving data based on RL according to the present disclosure.

An algorithm for RL may be derived as follows.

Step 1: Perform initialization
 A learning rate α, a discount factor γ, and an exploration probability e are set.
 A target BLER is set.
 The number of MCS offset indices is set to L.
 The number of quantization levels for each BLER state E is set.
 Q values of a Q-table are set to 0.
 t=0 and T is set.

Step 2: Compute a reward for each action.
 CQI input and ACK/NACK for a data block
 2-1: Compute $\theta_m$ from beta distribution using parameters ($a_m$, $b_m$) for each offset index m, where $a_m$ is incremented for ACK and $b_m$ is incremented for NACK.
 2-2: Compute $\theta_m$ from an empirical formula for each m.

Step 3: Update the Q-table using Equation 6.
Step 4: Select an action using Equation 7 and set t to t+1 (t=t+1).

If t<T, a procedure proceeds to Step 2 (T: preset value)

A method implemented by the BS includes the methods proposed in the present disclosure and combinations thereof by reference.

In the case of link adaptation, the present disclosure may improve system throughput by selecting an optimal MCS offset. In the case of power control, the present disclosure may reduce transmit power by selecting an optimal SIR adjustment value.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method and apparatus for efficiently implementing link adaptation and power control based on RL are industrially applicable to various wireless communication systems such as a 3GPP LTE/LTE-A system and a 5G communication system.

The invention claimed is:

1. A method of transmitting data by a base station in a wireless communication system, the method comprising:
 transmitting a reference signal (RS) to one or more user equipments (UEs);
 receiving channel quality indication (CQI) information based on reception of the RS from the one or more UEs;
 determining a modulation and coding scheme (MCS) level based on the CQI information;
 transmitting data to the one or more UEs in relation to the MCS level; and
 receiving acknowledgement/negative acknowledgement (ACK/NACK) for the transmitted data,
 wherein the MCS level is determined based on the CQI information and on an offset determined according to a machine learning process, and
 wherein the machine learning process for determining the offset is performed by setting any one selected from among a plurality of MCS offset values to an operation value of machine learning, setting an error rate for the operation value to a state value of the machine learning, and setting a processing rate at a level at which the error rate satisfies a predetermined criterion to a reward value of the machine learning process.

2. The method of claim 1, wherein the determining the offset comprises:
 (1) obtaining a block error rate (BLER) as a current state of the machine learning;
 (2) selecting any one of the MCS offset values as machine learning operations applied to the current state;
 (3) repeating a predetermined number of times a process of calculating an expected reward value of each of the machine learning operations, updating a Q-table of the machine learning according to the calculated expected reward value, and recalculating the expected reward value based on the updated Q-table; and
 determining one MCS offset value based on the updated Q-table according to the process of (3).

3. The method of claim 2, wherein the current state of the machine learning is obtained based on a duration acquired by unequally quantizing a representation range of the BLER.

4. The method of claim 3, wherein the unequally quantizing the representation range of the BLER comprises performing quantization by setting a first quantization unit of a first range near a target BLER in the representation range of the BLER to be smaller than a second quantization unit of a second range other than the first range.

5. The method of claim 3, wherein the Q-table is a matrix determined based on the number of the MCS offset values and the quantized representation range of the BLER.

6. The method of claim 2, wherein the determining the one MCS offset value comprises determining the one MCS offset value based on beta distribution having a first parameter and a second parameter, and wherein the first parameter increases based on reception of ACK and the second parameter increases based on reception of NACK.

7. The method of claim 1, wherein the machine learning process for determining the offset comprises performing Q-learning.

8. The method of claim 1, wherein the number of the MCS offset values is set to 2L+1, where L is the number of MCSs supported by the base station.

9. A base station for transmitting data in a wireless communication system, the base station comprising:
 a radio frequency (RF) transceiver; and
 a processor configured to:
  control the RF transceiver to transmit a reference signal (RS) to one or more user equipments (UEs);
  control the RF transceiver to receive channel quality indication (CQI) information based on reception of the RS from the one or more UEs;
  determine a modulation and coding scheme (MCS) level based on the CQI information;
  control the RF transceiver to transmit data to the one or more UEs in relation to the MCS level; and
  control the RF transceiver to receive acknowledgment/negative acknowledgement (ACK/NACK) for the transmitted data,
 wherein the MCS level is determined based on the CQI information and on an offset determined according to a machine learning process, and
 wherein the machine learning process for determining the offset is performed by setting any one selected from among a plurality of MCS offset values to an operation value of machine learning, setting an error rate for the operation value to a state value of the machine learning, and setting a processing rate at a level at which the error rate satisfies a predetermined criterion to a reward value of the machine learning process.

10. The base station of claim 9, wherein the determining the offset comprises:
 (1) obtaining a block error rate (BLER) as a current state of the machine learning;
 (2) selecting any one of the MCS offset values as machine learning operations applied to the current state;
 (3) repeating a predetermined number of times a process of calculating an expected reward value of each of the machine learning operations, updating a Q-table of the machine learning according to the calculated expected reward value, and recalculating the expected reward value based on the updated Q-table; and
 determining one MCS offset value based on the updated Q-table according to the process of (3).

11. The base station of claim 10, wherein the current state of the machine learning is obtained based on a duration acquired by unequally quantizing a representation range of the BLER.

12. The base station of claim 11, wherein the unequally quantizing the representation range of the BLER comprises performing quantization by setting a first quantization unit of a first range near a target BLER in the representation range of the BLER to be smaller than a second quantization unit of a second range other than the first range.

13. The base station of claim 11, wherein the Q-table is a matrix determined based on the number of the MCS offset values and the quantized representation range of the BLER.

14. The base station of claim 10, wherein the determining the one MCS offset value comprises determining the one MCS offset value based on beta distribution having a first parameter and a second parameter, and wherein the first parameter increases based on reception of ACK and the second parameter increases based on reception of NACK.

15. The base station of claim 10, wherein the machine learning process for determining the offset comprises performing Q-learning.

* * * * *